July 14, 1959 — M. W. ROSCOE ET AL — 2,894,411
CONTROL MECHANISM FOR FARM IMPLEMENT
Filed Dec. 10, 1953 — 3 Sheets-Sheet 1

INVENTORS
M. W. ROSCOE
O. P. LANCE
ATTORNEYS

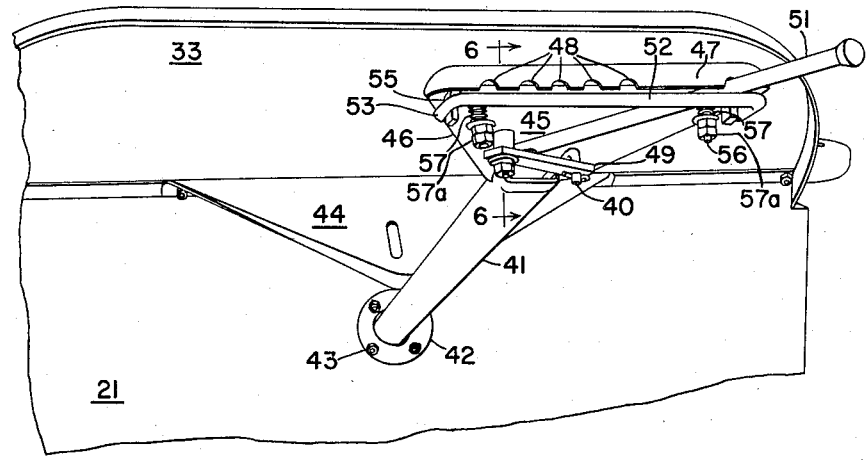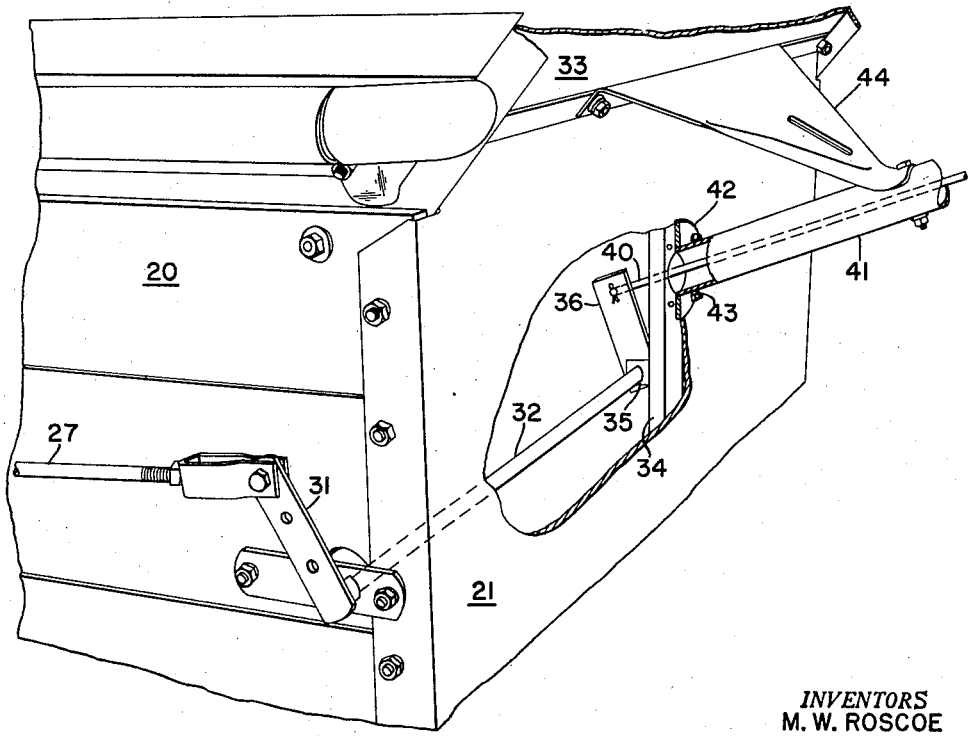

July 14, 1959   M. W. ROSCOE ET AL   2,894,411
CONTROL MECHANISM FOR FARM IMPLEMENT
Filed Dec. 10, 1953   3 Sheets-Sheet 3

INVENTORS
M. W. ROSCOE
O. P. LANCE

ATTORNEYS

United States Patent Office 2,894,411
Patented July 14, 1959

2,894,411

CONTROL MECHANISM FOR FARM IMPLEMENT

Merrill W. Roscoe and Orville P. Lance, Moline, Ill., assignors, by mesne assignments, to Deere & Company, a corporation of Delaware Application December 10, 1953, Serial No. 397,406

4 Claims. (Cl. 74—491)

This invention relates to a control mechanism on a farm implement of the type receiving its motive power from a tractor and still more particularly to the control mechanism on a tractor drawn manure spreader comprising a body supported at its rear on two laterally spaced wheels and at its front by the tractor drawbar.

It is standard procedure in a manure spreader to have an adjustable drive mechanism in the rear of the spreader for driving the apron, beaters and distributing means and for the adjustable mechanism to be linked to intermediate operating means in the form of a rockable member mounted transversely across the front of the spreader box. The operator on the tractor regulates the rate of discharge or feed by manipulation of the rockable member.

In the past the operator could adjust the rockable member in several ways all of which were unsatisfactory. The most common method was to provide a lever fixed to the member and extending in the general direction of the operator's station. The operator would adjust the angular position of the member by swinging the lever in a vertical direction. The difficulty arose because of the distance between the operator's station and the member being such as to require an exceptionally long lever, which resulted in a large arcuate movement at the operator's end of the lever to effect a relatively small angular movement of the member. At the adjustable extremities this forced the operator to stretch or bend creating a situation that was inconvenient and somewhat dangerous.

Another method was to reduce the length of the lever. However, this solved no problem since if it were too short the tractor had to be stopped and the adjustment made away from the operator's station or it would create a similar dangerous condition by forcing the operator to turn and reach for the adjusting lever if adjustment was desired while the tractor was in motion.

It therefore is the object of this invention to provide a control means proximate to the operator's station for adjusting the driving mechanism on the manure spreader which requires a small and preferably lateral movement of a lever for a relatively large angular movement of the rockable member and causes a minimum of stretching or bending when readjustment is occurring.

It is also the object of this invention to enclose the force-transmitting means extending from the rockshaft to the control means within a tubular support rigidly fixed to the front of the spreader, thus reducing and defining within fine limits the space required to contain the manipulating means controlling the adjustable drive mechanism.

It is still a further object of the invention to provide means for maintaining the control means in a desired position by yieldably clamping a control lever between two members on of which is indented to correspond with the various rates of speed desired in the drive mechanism.

The foregoing and other objects of the invention will become readily apparent to those skilled in the art in the following detailed description in which:

Fig. 2 is a fragmentary end view of the front section of the spreader showing the tubular support, the control means, and the notched clamping means for maintaining the control lever in the desired location.

Fig. 3 is a fragmentary perspective view showing cutaway portions of the front paneling of the spreader, the supporting tube, and shows clearly the force transmitting member connected to the transverse rockshaft.

Figure 1:
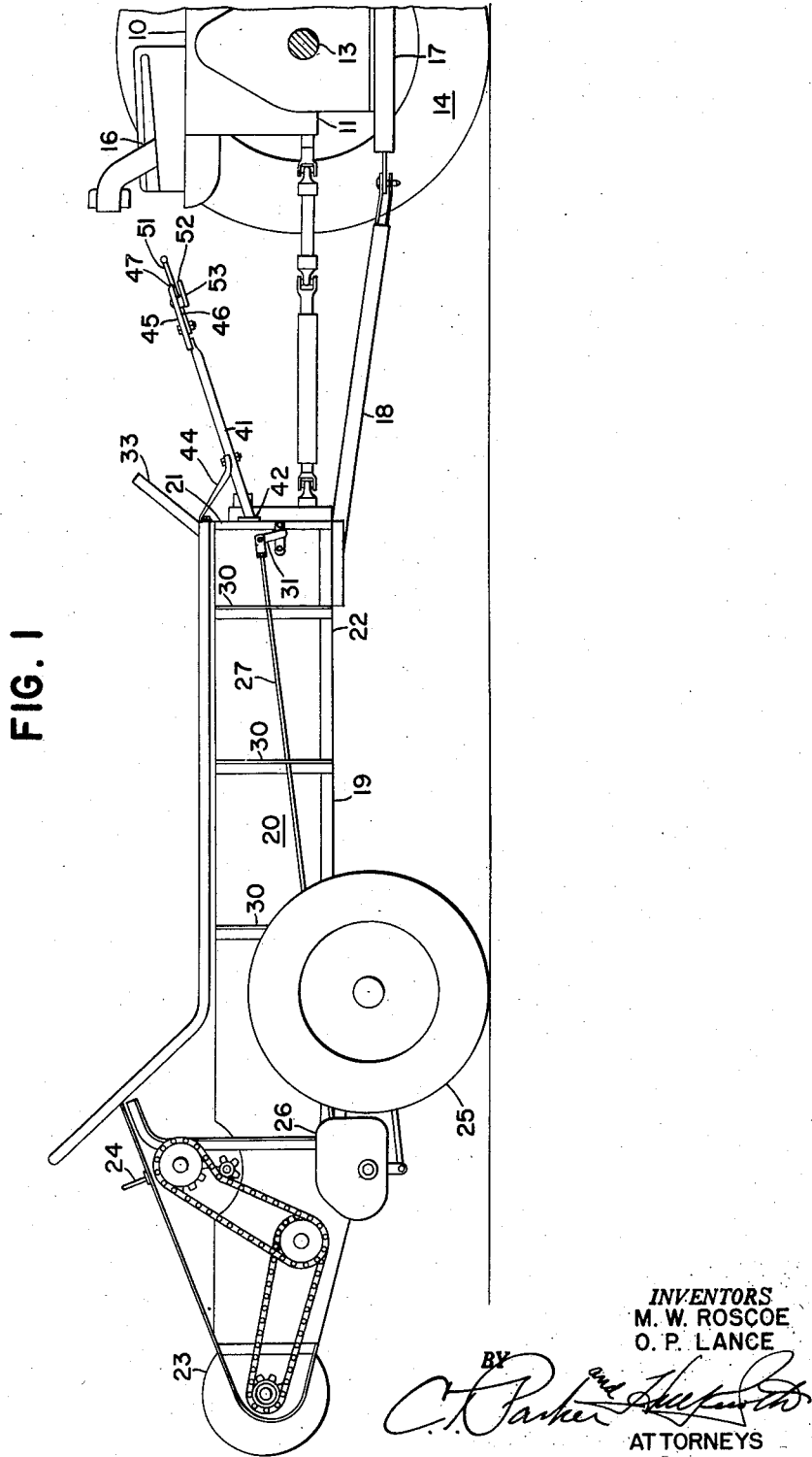
Fig. 1 is a side elevation of the manure spreader and tractor embodying the invention.
Figure 4:
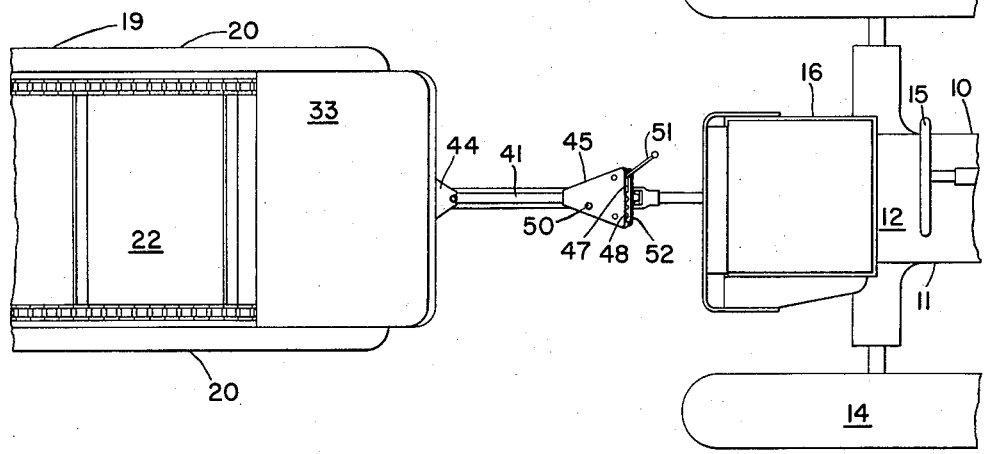
Fig. 4 is a fragmentary plan view of the tractor and manure spreader showing particularly the close proximity of the manure spreader control means relative to the operator's station.
Figure 5:
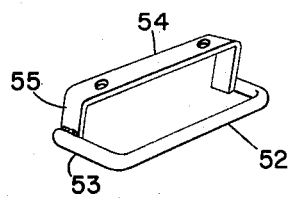
Fig. 5 is a detail perspective showing the bail member fixed to the U-bar and their relative position to one another.

Referring now to the figures, numeral 10 designates a tractor of a conventional type comprising a frame 11 supporting a longitudinally extending tractor body 12 and in turn supported by a rear axle 13 between two laterally spaced wheels 14, and two front wheels, not shown. A steering wheel 15 is mounted on the tractor forwardly of and above a tractor seat 16. A tractor drawbar 17 extends rearwardly and is connected to a draft member 18 on a manure spreader 19.

The manure spreader 19 is for the most part of a standard commercial model including a box type body having two sides 20, a front end 21, and a floor 22. Mounted laterally on the rear of the spreader is a rotary widespread 23 and a rotary beater and distributing system 24. Supporting the rear of the spreader are two laterally spaced apart wheels 25. Adjustable driving mechanism, referred to in its entirety by the numeral 26, is basically not unlike that set forth in U.S. Patent No. 1,215,614. An operating rod 27 which adjusts the adjustable driving mechanism 26 extends forwardly through angle iron side supports 30 to the forward part of the spreader where it is connected to an intermediate operating means comprising a lever arm 31 fixed to a transverse rockshaft 32.

Extending laterally from side to side of the spreader 19 and positioned on an inclined angle so that its lower rear portion is fixed to the floor 22 and its forward upper portion protrudes upwardly and forwardly of the front panel 21, is the dashboard 33.

Mounted between the dashboard 33 and the front panel is a vertically disposed angle iron support 34. A bracket 35 is fixed to the angle iron 33 and is apertured at its rearward end to receive the rockshaft 32. A rocker arm 36 is fixed to the rockshaft 32 and extends outwardly from the rockshaft to a point generally opposite an opening in the front panel 21.

Force transmitting means in the form of a link 40 is pivotally connected to the rocker arm and extends through the front panel opening and in a forward and upward direction to a point proximate to the operator's station.

An elongated tubular supporting means 41 hereafter referred to as a tube having a flange 42 is rigidly mounted on the front panel by bolts 43. The rear lip of the tube 41 extends through the opening in the front panel 21.

The link 40 is loosely contained in the tube 41 for movement in its axial direction. A structural support 44 is added as means for securing the tube 41 in its fixed position.

A triangular shaped plate-like member 45 is welded to the upper end of the support tube 41 at one apex of the triangle. The member is disposed in a lateral plane generally parallel to an extension of the center line or axis of the tube 41 except for the turned downward flame or apron 46, 47 on all edges of the triangular member 45. The front apron 47 contains selectively spaced notches 48.

A pivot bolt 50 located to one side of a continuation of the axis of the tube 41 depends from the face of the member 45. A swingable lever 49 is pivotally and articulately mounted, as later explained, to the bolt 50 and apertured at its end to receive the forward end of the force transmitting link 40 which extends beyond the tube support 41. Rigidly fixed to the swingable lever at a point between the pivot bolt 50 and the aperture is a control arm 51 which extends forwardly and out from directly under the triangular member 45. At the extreme forward end of the lever arm 51 is gripping means which is in this case a knob conveniently available to the operator for lateral movement.

A laterally extending bail 52 parallel and directly below the front apron 47 of the triangular member 45 clamps the control arm in one of the notches 48. The rearwardly extending legs 53 of the bail 52 are rigidly fixed to depending legs 55 of a U-shaped bar member 54. Two bolts 56 each located in the vicinity of the corners of the triangular member 45 depend through registering openings in the triangular member 45 and the cross bar of the U-shaped member 54. Springs 57 mounted on the bolts 56 below the cross bar and washer-nut combination 57a serve as yieldable holding means securing the U-shaped member 54 and the triangular member 45 together.

Figure 6:
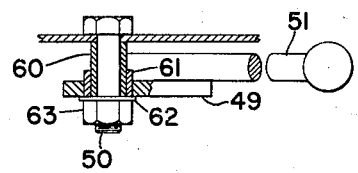
Fig. 6 is a detail sectional view showing the articulate connecting means between the swinging member and the triangular plate shaped member. The section is taken along line 6—6 of Fig. 2.

Reference is here made to Fig. 6 for detail of the articulate connection between the triangular plate member 45 and the swingable lever 49. The connection comprises an inner ferrule 60 fitting snugly on the bolt 50. An outer ferrule 61 is mounted on the outer surface of the inner ferrule 60 and is of considerably less height than the inner ferrule. The swingable lever 49 is apertured to receive the outer ferrule 61 and is fixed as by welding to the ferrule 61. A washer 62 abuts the end of the inner ferrule 60 and in conjunction with the nut 63 serves to hold the inner ferrule 60 against the triangular member 45 and the outer ferrule 61 on the inner ferrule 60.

It becomes apparent that with the arrangement of the parts as described the swingable lever 49 may freely pivot about the axis of the bolt and may move bodily in a plane parallel to the axis of the bolt by an overall amount equal to the difference in height of the inner and outer ferrules. The control arm 51 being rigidly fixed to the swingable lever 49 will thus be able to swing in a plane generally parallel to the face of the triangular plate and will have sufficient vertical movement to escape and return to the notches 48 in the apron 47 of the triangular member 45.

The invention works in the following manner: the operator, wishing to manipulate the adjustable driving mechanism in the rear of the spreader, may do so merely by pushing downwardly on the control arm 51 until the bail member 52 yields sufficiently to permit slidable movement of the arm 51 along the bail 52 to a desired rate of speed. The control arm 51 is then set in the corresponding notch 48 automatically permitting the bail member, reacting to the compressive pressure of the springs, to clamp it in the specified notch. The legs 55 of the U-shaped member 54 act as stops to excessive lateral movement of the control arm.

Movement of the control arm 51 and the swingable part 49 which is rigidly fixed to the arm results in a fore and aft reactive action of the force transmitting shaft in the direction of its axis which causes an angular displacement in the rockshaft 32.

Although mounting of the control arm for swinging laterally is preferred because it then operates at a convenient level as well as in a convenient zone of relatively narrow lateral dimension, substantial benefit would be obtained were the control arm arranged for swinging vertically or in any other direction as long as the principle of the short stroke is observed.

What I claim, therefore, and desire to secure by Letters Patent is:

1. A remote control mechanism for a material unloader of the type having a mobile material containing body with a front uprightly and transversely disposed wall, and operating mechanism on the body adjustably responsive to rocking motion of a transverse shaft supported adjacent the front wall, said control mechanism comprising: a rigid and elongated tubular member having a rear end fixedly mounted to the front wall and a forward end remote from said wall; means forming a pivot adjacent the forward end; a swingable part mounted on the pivot; a relatively short hand operated control element adjacent the forward end of the tubular member and extending outwardly therefrom; means connecting said control element with the swingable part to effect movement of said part on the pivot in response to adjustment of the element; a rock arm mounted on the transverse shaft adjacent to the rear end of the tubular member; and a force transmitting link contained within the tubular member and having its rear end connected to the rock arm and its forward end connected to the swingable part to effect rockable adjustment of the shaft in response to manipulation of the control element.

2. The invenion set forth in claim 1 further characterized by the control element being rigid with the swingable part, and the pivot being a vertically disposed pivot so as to limit movement of the control element within a laterally disposed plane.

3. The invention set forth in claim 1 further characterized by a position selecting means carried by the tubular member and cooperative with the control element for holding the control element in a selected position.

4. The invention set forth in claim 3 further characterized by the position selecting means comprising a laterally disposed selector part rigidly fixed to the tubular member a clamping member generally parallel to the selector part and disposed so as to have the control element between the selector part and the clamping member, retaining structure on the selector part including a plurality of notches effective to receive the control element in any of a plurality of stations, and yieldable means securing the clamping member to the selector part with sufficient force to seat the control element in the notches and to permit slidable readjustment of the control element between the notches.

References Cited in the file of this patent
UNITED STATES PATENTS

| | | |
|---|---|---|
| 749,517 | Ball | Jan. 12, 1904 |
| 781,956 | Kinney | Feb. 7, 1905 |
| 887,180 | Barnes | May 12, 1908 |
| 948,804 | Winterling | Feb. 8, 1910 |
| 1,140,091 | Woodard | May 18, 1915 |
| 1,226,711 | Shakespeare et al. | May 22, 1917 |
| 2,195,338 | Neumann et al. | Mar. 26, 1940 |
| 2,342,837 | Brown | Feb. 29, 1944 |
| 2,393,849 | Werts | Jan. 29, 1946 |
| 2,660,439 | Scranton | Nov. 24, 1953 |
| 2,669,949 | Neighbour | Jan. 18, 1955 |